(12) United States Patent
Ricklis

(10) Patent No.: US 12,061,918 B2
(45) Date of Patent: Aug. 13, 2024

(54) COMPLEX, DYNAMIC ROUTING FOR NESTED RUNTIME MICRO FRONT ENDS

(71) Applicant: Capital One Services, LLC, McLean, VA (US)

(72) Inventor: Jonathan Ricklis, Richardson, TX (US)

(73) Assignee: Capital One Services, LLC, McLean, VA (US)

( * ) Notice: Subject to any disclaimer, the term of this patent is extended or adjusted under 35 U.S.C. 154(b) by 34 days.

(21) Appl. No.: 17/380,292

(22) Filed: Jul. 20, 2021

(65) Prior Publication Data

US 2023/0023654 A1    Jan. 26, 2023

(51) Int. Cl.
*G06F 9/455*    (2018.01)
*G06F 9/451*    (2018.01)

(52) U.S. Cl.
CPC .......... *G06F 9/45529* (2013.01); *G06F 9/451* (2018.02)

(58) Field of Classification Search
CPC ............................. G06F 9/45529; G06F 9/451
USPC ....................................................... 717/115
See application file for complete search history.

(56) References Cited

U.S. PATENT DOCUMENTS

| 10,678,600 | B1 | 6/2020 | Darling et al. | |
|---|---|---|---|---|
| 2012/0150833 | A1* | 6/2012 | Parthasarathy | G06F 16/955 707/706 |
| 2013/0218999 | A1* | 8/2013 | Martin | G06Q 10/10 709/224 |
| 2015/0347616 | A1* | 12/2015 | Levi | G06F 16/9535 715/234 |
| 2018/0074795 | A1* | 3/2018 | Benge | H04N 21/47205 |
| 2020/0097611 | A1* | 3/2020 | Ray | G06F 9/485 |
| 2021/0248205 | A1* | 8/2021 | Tank | G06F 16/986 |
| 2022/0166839 | A1* | 5/2022 | Vihar | G06F 9/542 |

FOREIGN PATENT DOCUMENTS

| CN | 109542538 A | 3/2019 |
|---|---|---|
| CN | 110708368 A | 1/2020 |
| CN | 111737032 A | 10/2020 |
| CN | 111796860 A | 10/2020 |

* cited by examiner

*Primary Examiner* — Bradford F Wheaton
(74) *Attorney, Agent, or Firm* — Sterne, Kessler, Goldstein & Fox P.L.L.C.

(57) ABSTRACT

Provided herein are systems and method for providing routing of complex dynamically updated website applications using micro front ends (MFEs). The MFEs can be instantiated in a nested fashion. Each MFE can be agnostic to other levels of the website application structure that are not directly adjacent to the MFE in the hierarchy of the nesting. Navigation events can be bubbled up to a shell application to retain top-level control of routing within the website application without requiring the shell application to have all levels of routing in the hierarchy.

20 Claims, 6 Drawing Sheets

COMPLEX, DYNAMIC ROUTING FOR NESTED RUNTIME MICRO FRONT ENDS

BACKGROUND

Micro front ends (MFEs) allow a website application developer to divide up development steps. Different functionality in the website application can be divided up and even developed using different tools. This allows flexibility in development teams. While MFEs are configured to be integrated despite this flexibility, the deployed website application can face difficulties, especially if the MFEs are dynamically updated during the life of the application. A host application in the web application may control routing of the website application. This can require knowledge of some or all of the internal routes and subroutes in each part of the website application. Since each application, including the host application, is developed separately from the other MFEs, the routes can only be learned after deployment. In some cases, this can be a complex process and various approaches have been developed to extract or learn the routes for each MFE and provide this information to the host application. When an MFE is updated after initial deployment, this can require additional route learning, as an MFE update could potentially change the MFE's routing structure significantly. One alternative is to proscribe the routes for each MFE. While this is effective in reducing the overhead required for route learning, it also can restrict the flexibility of the MFEs and the MFE development process, which can reduce the benefit of using MFEs in the first instance.

BRIEF SUMMARY

Disclosed herein are system, method and computer program product embodiments, and/or combinations and subcombinations thereof for providing routing for nested MFEs.

In some embodiments, a system or method for providing routing for nested MFEs can parse a uniform resource locator (URL) for a web application in the shell or host application. The URL can be parsed into a URL data and unmatched portions. The URL data can include route labels and other data for the web application. The shell application can load MFEs based on the route labels and send them relevant portions of the other data and the unmatched portions. The MFEs can then load MFEs nested in themselves based on the unmatched portions. The shell application and the nested application can be agnostic to one another.

Further aspects, features, and advantages of the present disclosure, as well as the structure and operation of the various aspects of the present disclosure, are described in detail below with reference to the accompanying drawings.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Disclosed herein are system, method and computer program product embodiments, and/or combinations and subcombinations thereof for providing routing for nested MFEs.

Figure 1:
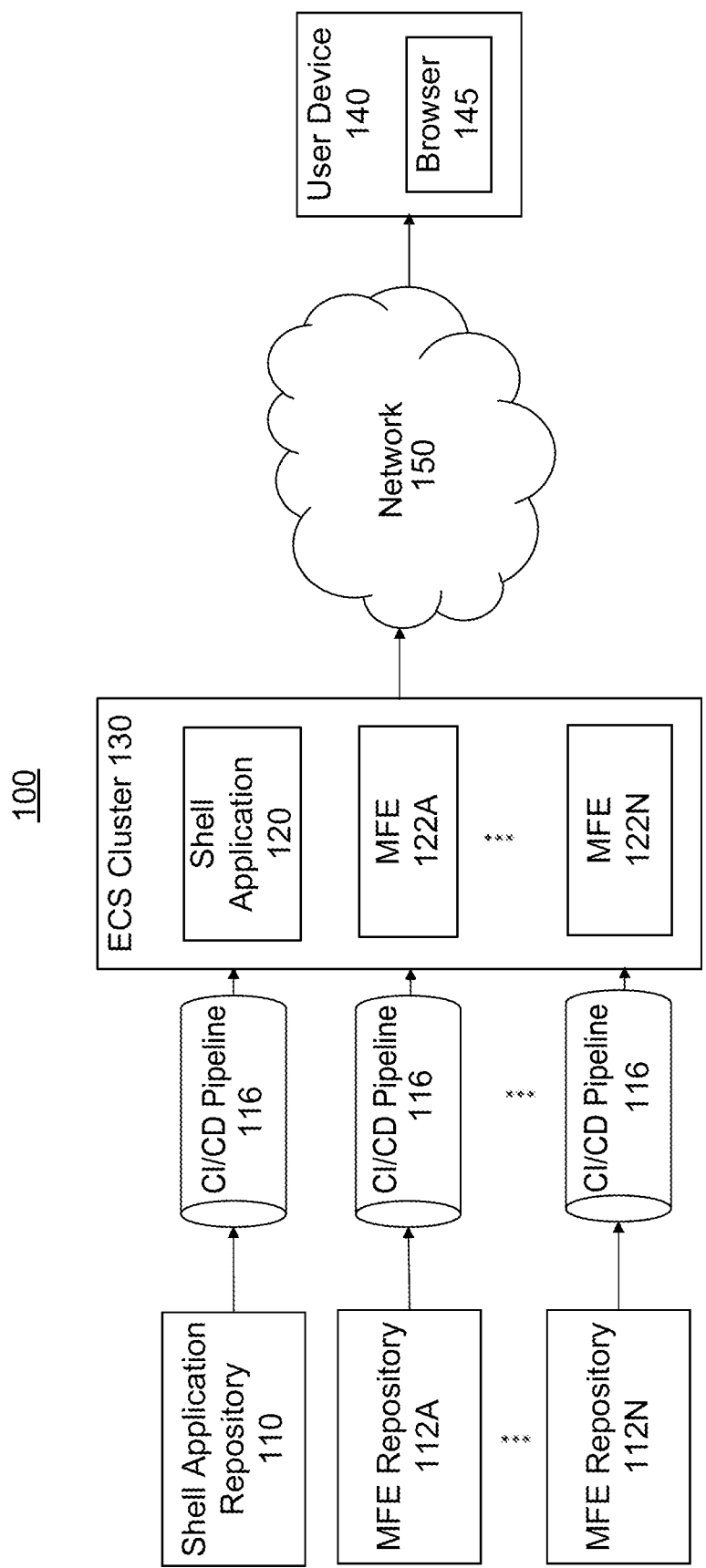
FIG. 1 illustrates a block diagram of an example environment for using nested MFEs, according to some embodiments.

FIG. 1 illustrates a block diagram of an example environment 100 for using nested MFEs, according to some embodiments. The example environment 100 can include repositories (e.g., shell application repository 110 and MFE repositories 112A-N), a set of continuous integration/continuous development (CI/CD) pipelines 116, an Elastic Container Service (ECS) cluster 130, a network 150, and a user device 140. These can each be implemented, alone or in combination, on a computer, such as computer system 600, or in a network or cloud environment.

Shell application repository 110 can be a repository for a host or shell application 120. MFE repositories 112A-112N (collectively, MFE repositories 112) can be repositories for the MFEs 122A-122N (collectively, MFEs 122) that are part of the shell application 120. In some embodiments, each MFE 122 for the shell application 120 can be developed in a repository (e.g., shell application repository 110 and MFE repositories 112A-N). The number of MFE repositories 112 depends on the specific application and the quantity shown in FIG. 1 should not be seen as limiting.

In some embodiments, the shell application 120 and the MFEs 122 can be deployed to the ECS cluster 130 by the CI/CD pipelines 116. Each CI/CD pipeline 116 can transfer information from the associated repository (e.g., the shell application repository 110 or one of the MFE repositories 112) to the ECS cluster 130. The CI/CD pipelines 116 can be configured to allow dynamic updating of the shell application 120 and the MFEs 122 throughout the life of the shell application 120.

The ECS cluster 130 can store the shell application 120 and the MFEs 122. In some embodiments, the ECS cluster 130 can act as a host or server for the website application, from which users can access the shell application 120. The ECS cluster 130 can be accessible through the network 150. In some embodiments, the shell application 120 can also be an MFE.

In some embodiments, each MFE 122 (including the shell application 120) can be implemented or designed in its own programming environment. This allows for flexibility in designing the shell application 120 and the MFEs 122. Developers can choose a preferred development environment and the shell application 120 can integrate the various MFEs 122 using MFE standard protocols. In some embodiments, due to variation in development environments, the shell application repository 110 and MFE repositories 112 can vary based on the selected development environment for the corresponding MFE 122 (including the shell application 120). In some embodiments, this can also result in variation in the CI/CD pipelines 116 for the same reason.

The user device 140 can have a browser 145. The user device can be any user computing device, such as a computer (e.g., computer system 600), a mobile or smart phone, a tablet, or any other device capable of running the browser 145. The browser 145 can be a browser or application capable of running the website application. The user device 140 can access the ECS cluster 130 to open the website application in the browser 145. In some embodiments, this causes the shell application 120 to load in the website application with the other MFEs 122 running within the shell application 120.

Figure 2:
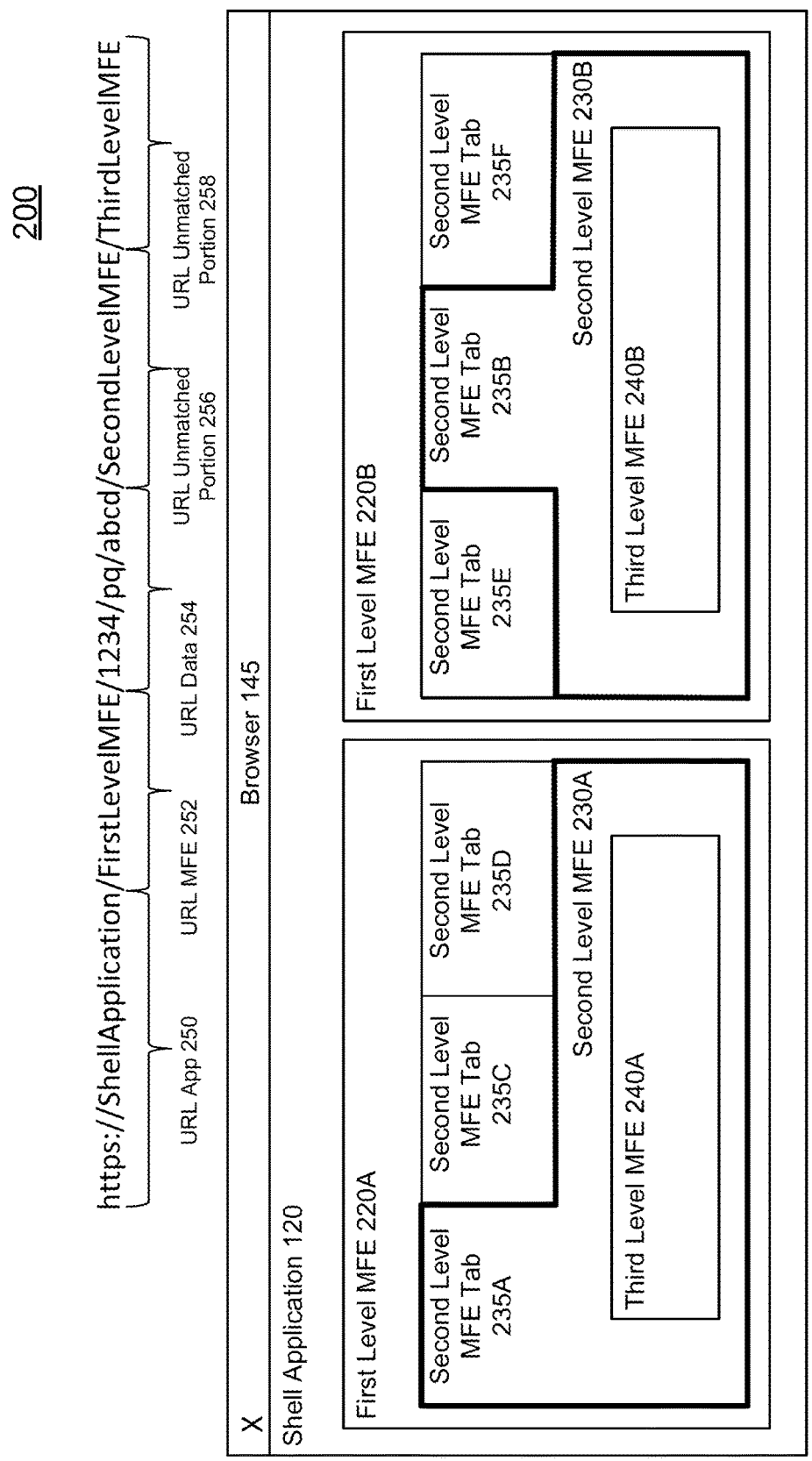
FIG. 2 illustrates a block diagram of an application and an associated URL that implement the nested MFEs, according to some embodiments.

FIG. 2 illustrates a block diagram of an application 200 and an associated URL that implement the nested MFEs, according to some embodiments. The application 200 can be a website application that runs in the browser 145. The shell application 120 is the top level, with nested first level MFEs 220A and 220B (collectively, first level MFEs 220), second level MFEs 230A and 230B (collectively, second level MFEs 230), and third level MFEs 240A and 240B (collectively, third level MFEs 240). In some embodiments, the second level MFEs 230 can have tabs, such as second level MFE tabs 235A-F (collectively, second level MFE tabs 235).

The nesting shown in FIG. 2 illustrates that the third level MFEs 240 can be nested in one of the second level MFEs 230, which can be nested in one of the first level MFEs 220, which can be nested in the shell application 120. For example, as shown in FIG. 2, third level MFE 240A is nested in second level MFE 230A, which is nested in first level MFE 220A, which is nested in shell application 120.

In some embodiments, a nested MFE is run or instantiated in the higher-level MFE or shell application in which it is nested. For example, third level MFE 240A is run or instantiated in second level MFE 230A and second level MFE 230A is run or instantiated in first level MFE 220A. Thus, the present disclosure provides for a hierarchical nesting, wherein each MFE can be instantiated by a higher level MFE, while also instantiating a lower level MFE itself. For example, first level MFE 220A can be instantiated by shell application 120 while the first level MFE 220A instantiates second level MFE 230A. In some embodiments, a highest level MFE of the hierarchical nesting can be the shell application 120.

While FIG. 2 shows specific nesting and number of levels, this is only intended to be an example and there can be any number of levels, with any amount of nesting, including multiple MFEs at one level being nested in a higher level MFE, according to the specifications and design of the website application.

In some embodiments, as shown in FIG. 2, one or more MFEs on a level, such as second level MFEs 230, can have tabs (e.g., second level MFE tabs 235). Second level MFE tabs 235 can allow a user to select between multiple MFEs available at the given level and activate a desired MFE at that level. For example, first level MFE 220A can have second level MFEs 230 nested within itself and each of the second level MFEs 230 can have an associated tab. e.g., second level MFE tabs 235A, 235C, and 235D, respectively. In some embodiments, one of the second level MFEs 230, e.g., second level MFE 230A, can be active, while any remaining second level MFEs, e.g., second level MFEs associated with second level MFE tabs 235C, 235D, are inactive. The tab for an inactive MFE (e.g., second level MFE tab 235C) can be selected or activated to switch from the active MFE (e.g., second level MFE 230A) to the inactive MFE associated with the tab.

For example, one of the nested MFEs can be shown as active by having the tab shown as the top level tab or other known methods in the art. In FIG. 2, the active MFE and tab are indicated by the thicker outline of the area (e.g., the dark line surrounding second level MFE 230A and second level MFE tab 235A, as well as the second level MFE 230B and the second level MFE tab 235B). Second level MFE tab 235C can be clicked or activated. Second level MFE 230A and second level MFE tab 235A can be deactivated and the first level MFE 220A can load a new second level MFE 230 that is associated with second level MFE tab 235C.

An embodiment of a uniform resource locator (URL) shown in FIG. 2 can include a URL App 250, a URL MFE 252, a URL data 254, a first URL unmatched portion 256, and a second URL unmatched portion 258. The URL can be the visible URL depicted for the website application in the browser 145. In some embodiments, the URL app 250 can identify the shell application 120 and the browser 145 can use the URL app 250 to instantiate the shell application 120. In response to being instantiated, the shell application 120 may analyze the URL MFE 252 and the URL data 254, which can include query parameters, formatted data, first level MFE tags, or other information. Based on this analysis, the shell application 120 can use the URL MFE 252 to instantiate one of the first level MFEs 220. The shell application 120 can send (or pass) the URL data 254 to the instantiated first level MFE 220, which can use the URL data 254 to provide different functions to the website application, as should be understood by those of ordinary skill in the art. In some embodiments, the URL data 254 can be sent to the instantiated first level MFE 220 based on routing or usage defined for the shell application 120.

In some embodiments, the shell application 120 can send (or pass) the first and second URL unmatched portions 256 and 258 to the instantiated first level MFE 220. For example, the shell application 120 can parse the URL and determine that the first and second URL unmatched portions 256 and 258 are MFE identifiers, and can send (or pass) the first and second URL unmatched portions 256 and 258 to the instantiated first level MFE 220. In turn, the instantiated first level MFE 220 may use the first and second URL unmatched portions 256 and 258 to identify and instantiate one of the second level MFEs 230 nested in the instantiated first level MFE 220. For example, the first URL unmatched portion 256 may be another URL MFE used to instantiate one of the second level MFEs 230 and the second unmatched portion 258 may be second URL data 254 used by the instantiated second level MFE 230 to provide different functions to the website application. This arrangement enables to the shell application 120 to handle routing to the first level MFEs 220, the first level MFEs 220 to handle routing to the second level MFEs 230, and so on an so forth. That is, in some embodiments, the shell application 120 has visibility into the first level MFEs 220 and enables the first level MFEs 220 to handle a next level of routing. For example, each of the first level MFEs 220 has visibility to second level MFEs 230 nested therein and enable these nested second level MFEs 230 to handle a next level of routing, and so on and so forth. In contrast, for conventional website applications, shell applications are responsible for handling all routing, and as such, shell applications are aware of all MFEs loaded at any level and the routes of each of these MFEs. Additionally, in conventional website applications, lower level MFEs can also provide their own routing, which causes shell applications and the MFEs to clobber each other (i.e., routing conflicts). To avoid clobbering, as described herein, the present disclosure distributes routing responsibilities between the shell application 120 and the different levels of MFEs. Thus, in some embodiments, because the shell application 120 handles routing to the first level of MFEs and does not handle routing for the lower level MFEs, the shell application 120 and the lower level MFEs (i.e., second level MFEs 230 and third level MFEs 240) can be agnostic to one another. Similarly, the first level MFEs 220 and the third level MFEs 240 can be agnostic to one another, and so forth. Thus, in some embodiments, each level of the web site application, whether the shell application 120 or one of the various MFEs 122, is aware of other MFEs 122 instantiated directly below or directly above that level (i.e., the shell application 120 and/or the various MFEs 122 are unware of any MFEs that are two or more levels away).

Since the second level MFEs 230 and the third level MFEs 240 are unknown to the shell application 120, the shell application 120 identifies portions of the URL corresponding to those MFEs as the URL unmatched portions 256 and 258. As such, the shell application can send (or pass) the RL unmatched portions 256 and 258 to the instantiated first level MFE 220. As discussed herein, the instantiated first level MFE 220 is aware of the nested second level MFEs 230 without being aware of the third level MFEs 240. In some embodiments, the instantiated first level MFE 220 can use of the URL data 254 and instantiate one of the nested second level MFEs 230, and send (or pass) the URL data 254 and remaining unmatched portions, in this case, URL unmatched portion 258, down to the instantiated second level MFE 230. In some embodiments, each level of MFEs can repeat the process performed by the instantiated first level MFE 220. In this way, embodiments of the present system can handle routing with nested MFEs without requiring full knowledge of the routing at the shell application 120.

In some embodiments, MFEs can have links to other URLs within the website application. For example, the second level MFE tabs 235C, D, E, and F can be links to second level MFEs 230 that correspond to the links and which are currently not instantiated in the corresponding first level MFEs 220A and B. In other examples, second level MFEs 230A and 230B can have links to other pages within them or to other MFEs. The shell application 120 can navigate the browser 145 to such URLs based on the activation of the links. However, because the links are located in MFEs nested below the first level MFEs 220, the shell application 120 is agnostic to those MFEs and, as such, the nested MFEs are unknown to the shell application 120.

In response to a user navigation action, e.g., a linking being activated, the nested MFEs may cause a bubbling up process. In some embodiments, bubbling up can be performed to send (or pass) the URL from the MFE level where the link was activated back up to the shell application 120. A link activation can generate a navigation event in the MFE where the link is located. For example, activating a link in the second level MFE 230A can generate a navigation event in second level MFE 230A. As another example, activating second level MFE tab 235C can generate a navigation event in first level MFE 220. The navigation event can include information for navigating to a URL, including the URL itself.

In some embodiments, each MFE can bubble up the navigation event to the MFE in which it is nested. For example, the second level MFE 230A can generate the navigation event and bubble it up to the first level MFE 220A, which in turn bubbles the navigation event up to the shell application 120. Once the navigation event has been bubbled up to the shell application 120, the shell application 120 can navigate the browser 145 to the new URL, which will route and instantiate MFEs at various levels, as described herein.

As an example, a website application for submitting a form can have a shell application 120 that is the general interface for accessing the form. The shell application 120 can instantiate a nested high level form manager as the first level MFE 220, while the first level MFE can instantiate the form itself nested as the second level MFE 230. A second tab instantiated in the second level can be a tab for a summary MFE for summarizing the form. The form and the form summary are aware that they are instantiated in the form manager where they are nested, while the shell application 120 is aware that it has instantiated the form manager that is nested in it. The summary MFE is not instantiated, but is available through the tab. The shell application 120 is also not aware that the tab is available. Since there is only one MFE trying to route different layers of the website application, clobbering can be avoided.

Figure 3:
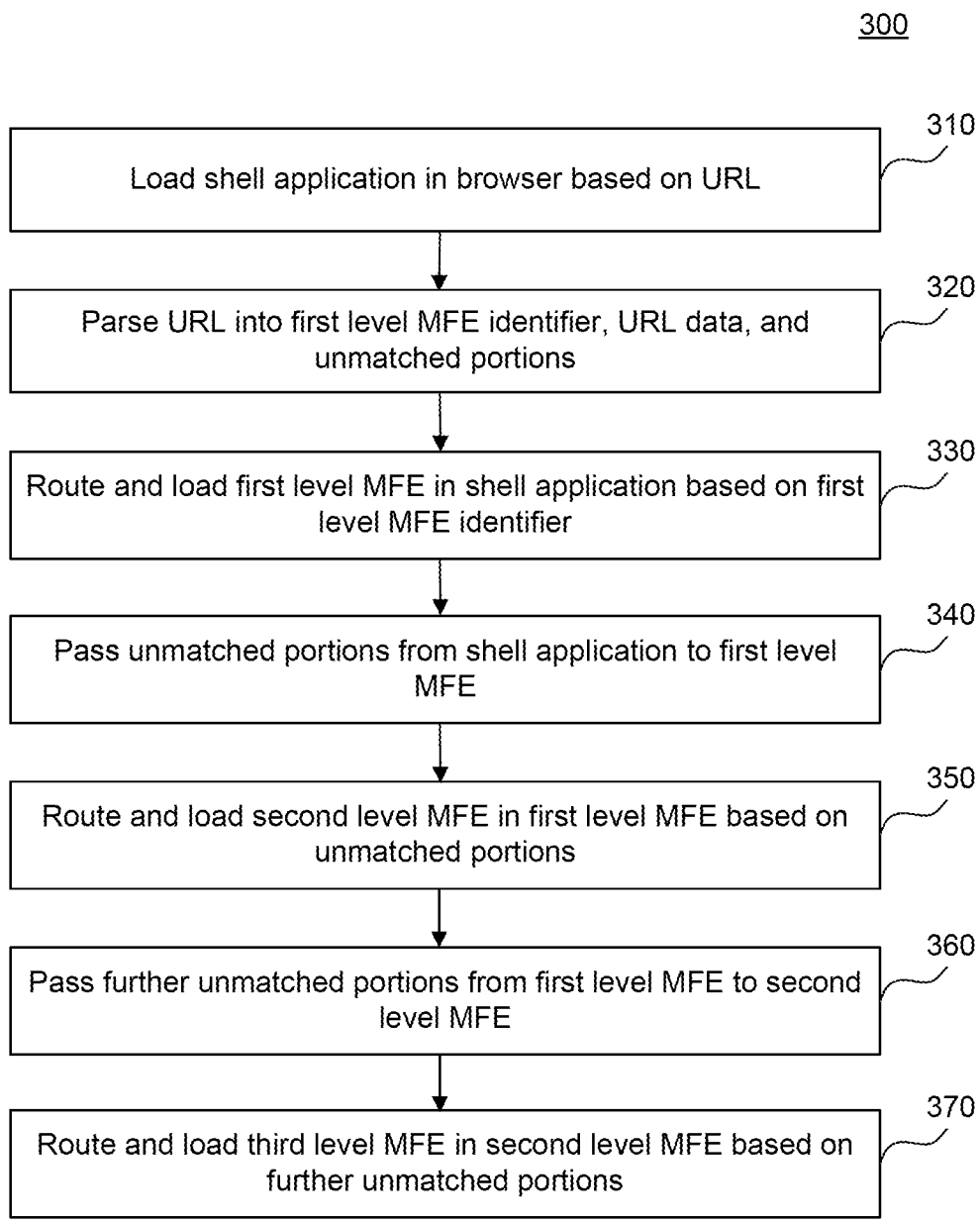
FIG. 3 is a flowchart illustrating a method for performing nested MFE routing in a website application, according to some embodiments.

FIG. 3 is a flowchart illustrating a method 300 for performing nested MFE routing in a website application, according to some embodiments. Method 300 can be performed by a browser 145 running the web site application. In some embodiments, steps of method 300 can be performed by shell application 120 and MFEs 122.

In 310, method 300 includes loading a shell application 120 in browser 145 based on a URL. The shell application 120 can be identified in or from the URL. In some embodiments, the shell application 120 is identified in the URL app 250. The browser 145 can load or instantiate the shell application 120.

In 320, method 300 includes parsing, by the shell application, the URL into first level MFE identifier (e.g., URL MFE 252), URL data 254, and unmatched portions (e.g., URL unmatched portions 256 and 258). The shell application 120 can separate the unmatched portions from the first level MFE identifier and URL data 254 as URL information to which the shell application 120 is agnostic. In some embodiments, the parsing can be performed using look up tables, query parameters, or routing tables that identify the first level MFE identifiers or labels.

In 330, method 300 includes routing and loading the first level MFE in the shell application 120 based on the first level MFE identifier. The shell application 120 can instantiate one of the first level MFEs 220 and send (or pass) the URL data 254 to the instantiated first level MFE 220. The shell application 120 can have knowledge of how the first level MFE 220 is routed in the web application.

In 340, method 300 includes sending (or passing) the first and second unmatched portions 256, 258 from the shell application 120 to the instantiated first level MFE 220.

In 350, method 300 includes routing and loading a second level MFE 230 in the first level MFE 220 based on unmatched portions. This routing can be handled by the first level MFE 220, such that the shell application 120 can be agnostic to this routing. In some embodiments, step 350 can instantiate tabs for second level MFEs 230 that are not currently being loaded in the first level MFE 220. The first level MFE 220 can instantiate the second level MFE 230 and any relevant tabs for other possible second level MFEs 230.

In 360, method 300 includes sending (or passing) further unmatched portions from the instantiated first level MFE 220 to the instantiated second level MFE 230. The first level MFE 220 can send (or pass) the further unmatched portions, such as URL unmatched portion 258, down to the instantiated second level MFE 230. Since the third level MFE 240 and the first level MFE 220 are agnostic to one another, the first level MFE 220 can treat the URL unmatched portion 258 as still being unmatched. In some embodiments, sending (or passing) further unmatched portions from the instantiated first level MFE 220 to the instantiated second level MFE 230 may further include sending (or passing) the URL data 254 down to the third level MFE 240. In some embodiments, this can depend on the routing in the first level MFE 220 or how the URL data 254 is used in the website application.

In 370, method 300 includes routing and loading a third level MFE 240 in the second level MFE 230 based further on the unmatched portions. This routing can be handled by the second level MFE 230, such that the shell application 120 and first level MFE 220 can be agnostic to this routing. The second level MFE 230 can instantiate the third level MFE 240 and any relevant tabs for other possible second level MFEs 230. The second level MFE 230 can know the routing information for the third level MFEs 240.

While method 300 is described with respect to a shell application 120 and three levels of MFEs, it should be understood by those of ordinary skill in the art that this is merely an example and that any number of MFE levels can be implemented in accordance with aspects of the present disclosure. Thus, for each level for which the URL has an identifier, a new MFE level can be instantiated and the unmatched portions can be passed down and the new instantiated MFE level For example, in a generalized embodiment, an MFE can receive URL data parsed from a URL. This can include unmatched portions. The MFE can determine a route label for a lower level MFE based on the URL. The MFE can then instantiate the lower level MFE based on the route label. The MFE can have a parent application, and the parent application and lower level MFE can be agnostic to one another. The parent application can be the shell application 120 or a higher level MFE (e.g., first level MFE 220 as compared to second level MFE 230).

Figure 4:
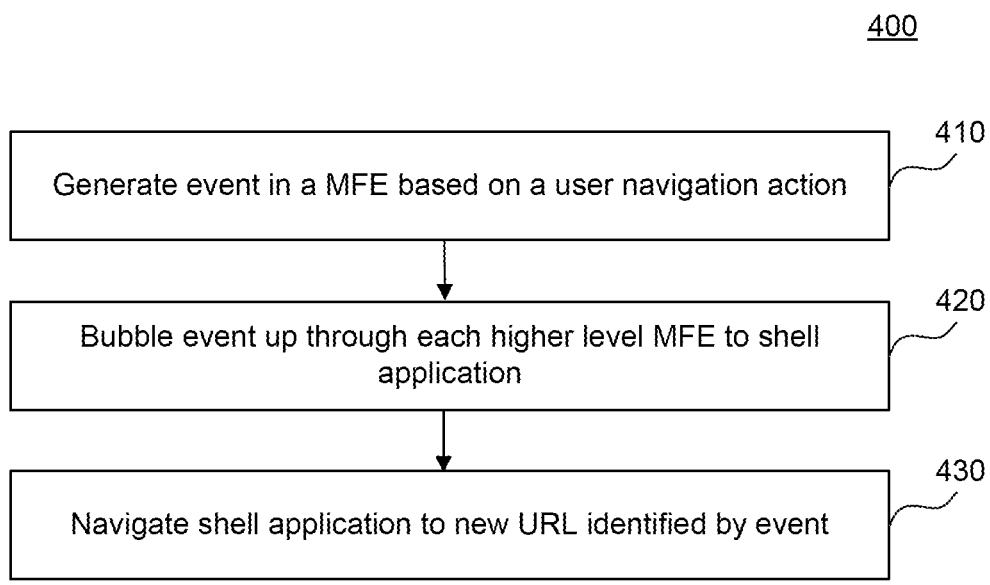
FIG. 4 is a flowchart illustrating a method for bubbling up navigation events from nested MFEs in a website application, according to some embodiments.

FIG. 4 is a flowchart illustrating a method for bubbling up navigation events from nested MFEs in a website application, according to some embodiments. In some embodiments, steps of method 400 can be performed by shell application 120 and MFEs 122.

In 410, method 400 includes generating an event in an MFE based on a user navigation action. In some embodiments, the event can be generated in the MFE level where the link was activated. In some embodiments, the event can be a navigation event. For example, in some embodiments, for a link in the second level MFE 230A, activating that link can trigger or generate the event in the second level MFE 230A. As another example, in some embodiments, for an inactive tab, such as second level MFE tab 235C, the event can be triggered or generated in the first level MFE 220A by activating or selecting the inactive tab.

In 420, method 400 includes bubbling the event up through each higher level MFE to the shell application 120. In some embodiments, each level of MFE can receive and send (or pass) the event to a higher level MFE or shell application 120 (e.g., a parent application). For example, if a link is activated in third level MFE 240B, the event is bubbled up to second level MFE 230B, then from the second level MFE 230B to the first level MFE 220B, and from the first level MFE 220B then to the shell application 120.

In 430, the method 400 includes navigating the shell application 120 to a new URL identified by the event. In some embodiments, the link or tab can identify the new URL. The shell application 120 can navigate the browser 145 to the new URL. Since a new URL has been reached, step 430 can include executing some or all of the steps of method 300 or 500, such as parsing of the URL and the multi-level instantiating described herein.

The processes of the present disclosure enable the website application to use a dynamic update of MFEs without requiring restrictions to the routing paths for each MFE or updating of routing paths in the shell application 120. The processes of the present disclosure also allow the website application to reduce or eliminate clobbering. Because of these advantages, the present disclosure can provide web developers with increased flexibility designing MFEs and allow them to use more complex MFEs, including dynamically updated MFEs.

Figure 5:
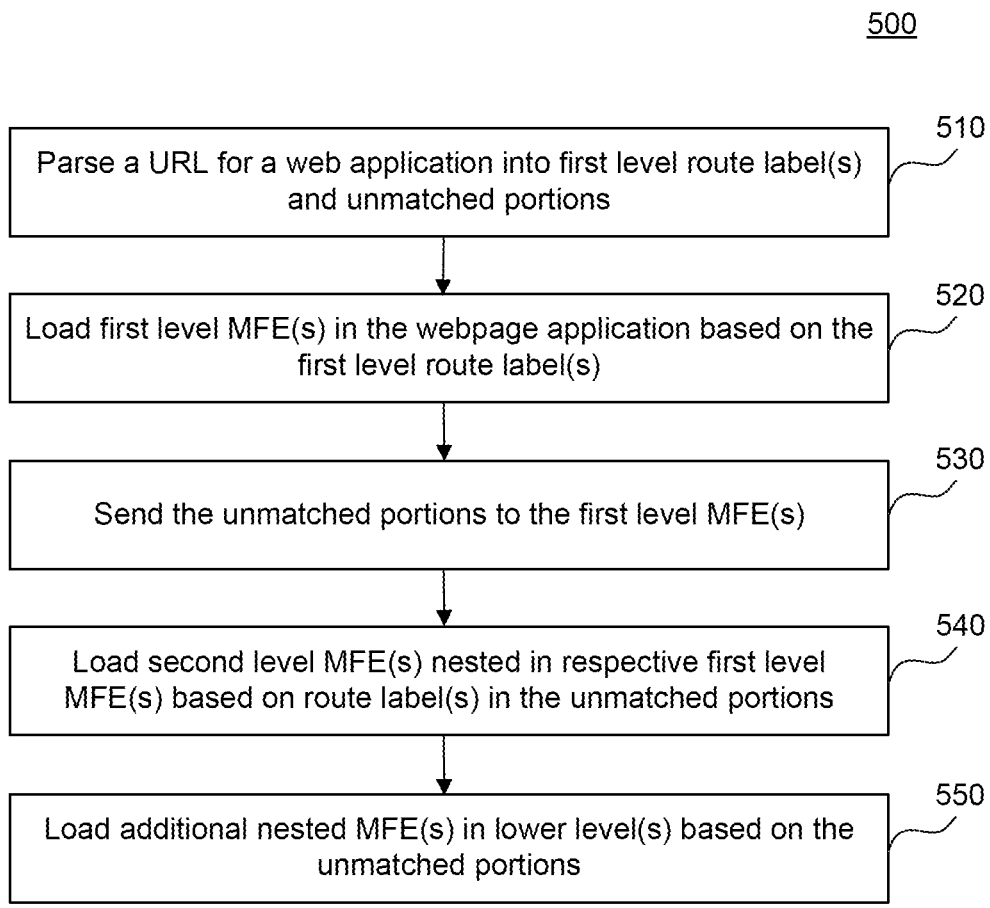
FIG. 5 is a flowchart illustrating a method for routing nested MFEs in a website application, according to some embodiments.

FIG. 5 is a flowchart illustrating a method 500 for routing nested MFEs in a website application, according to some embodiments. Method 500 can be performed by a browser 145 running the website application. In some embodiments, steps of method 500 can be performed by shell application 120 and MFEs 122.

In 510, method 500 includes parsing a URL for a web application into first level route label(s) and unmatched portions. In some embodiments, parsing the URL can be performed by shell application 120. The first level route label(s) can be one or more route labels in the URL, such as URL MFE 252, that the shell application 120 identifies as corresponding to first level MFEs 220 that can be instantiated in the shell application 120. In some embodiments, shell application 120 can have routes for instantiating the first level MFEs 220 and can use the routes to identify and parse out the first level route label(s).

In some embodiments, the URL includes URL data and unmatched portions. URL data can be parts of the URL that the shell application 120 can identify. For example, the URL data can include the first level route label(s), queries, or parameters that the shell application 120 is aware of, such as URL MFE 252 and URL data 254. The unmatched portions can be parts of the URL that include parameters that the shell application 120 is unaware of, such as URL unmatched portions 256 and 258. For example, the shell application 120 can be agnostic to MFEs instantiated below the first level. Because of this, route labels for such MFEs are unknown to the shell application 120 and it is unaware of them.

In 520, method 500 includes loading first level MFE(s) 220 in the webpage application based on the first level route label(s). In some embodiments, loading the first level MFEs can be performed by shell application 120. Each first level route label can correspond to a respective first level MFE 220. Shell application 120 can load a first level MFE by instantiating the first level MFE nested in the shell application 120.

In 530, method 500 includes sending the unmatched portions to the first level MFE(s) 220. In some embodiments, sending the unmatched portions to the first level MFE(s) can be performed by shell application 120. As part of step 530, the shell application 120 can also send the first level MFE(s) 220 portions of the URL that are URL data required by the first level MFE(s) 220, such as some or all of URL data 254.

In 540, method 500 includes loading second level MFE(s) 230 nested in respective first level MFE(s) 220 based on route label(s) in the unmatched portions. For example, URL unmatched portions 256 can be a route label for a second level MFE 230. In some embodiments, loading the second level MFE(s) can be performed by the respective first level MFE 220 in which the second level MFE 230 is nested. For example, first level MFEs 220A and 220B can be instantiated in the shell application 120, and the first level MFE 220A can have routing for second level MFE 230, such that the first level MFE 220A can load or instantiate the second level MFE 230A using the unmatched portions. To achieve this, the first level MFE(s) 220A can have knowledge of the second level MFEs 220 and can identify route labels in the unmatched portions received from the shell application 120. In some embodiments, first level MFE(s) 220 can extract portions of the unmatched portions that correspond to a route label for the second level MFE 230.

In 550, method 500 includes loading additional nested MFE(s) in lower level(s) based on the unmatched portion(s). In some embodiments, step 550 can be an iterative process where each level of MFE extracts the route labels that are known to that level, instantiates the corresponding MFEs nested at the next lower level, and passes on any remaining unmatched portions of that level. For example, after performing step 540, if any unmatched portions remain, the remaining unmatched portion(s) can be passed to the second level MFE(s) 230. Second level MFE(s) 230 can instantiate third level MFE(s) 240 based on identified route labels in the remaining unmatched portions. This process can be repeated for any additional levels of MFEs, e.g., third and fourth level MFEs. If all the unmatched portions have been used, then method 500 ends at 550.

As an example embodiment, step 540 can remove URL unmatched portions 256 as the route label for the second level MFEs 230. URL unmatched portions 258 remains in the unmatched portions and can be passed on to the second level MFEs 230 in step 550. Second level MFEs 230 can then identify URL unmatched portions 258, which is a routing label for a third level MFE 240. The second level MFEs 230 can instantiate the third level MFEs 240. Since no additional unmatched portions would remain, step 550 would then end.

Figure 6:
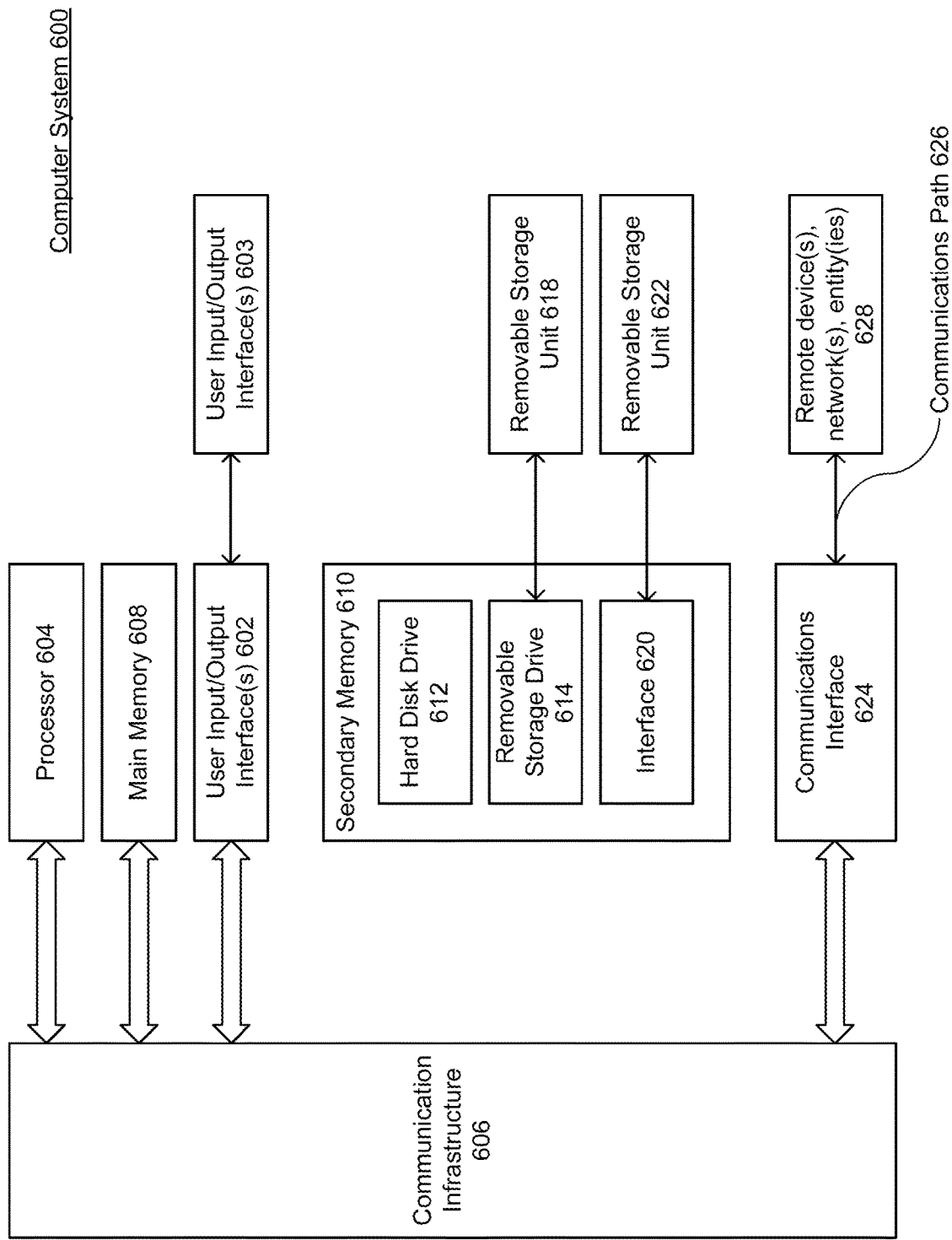
FIG. 6 depicts an example computer system useful for implementing various embodiments.

FIG. 6 depicts an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. A method, comprising:
    parsing, in a shell application of a web application, a uniform resource locator (URL) for the web application into a first route label and unmatched portions;
    loading, in the shell application, a first micro front end (MFE) nested in the shell application based on the first route label;
    sending, by the shell application, the unmatched portions to the first MFE;
    loading, by the first MFE, a second MFE nested in the first MFE using a second route label corresponding to the second MFE determined from the unmatched portions, wherein loading the second MFE comprises loading an active second-level MFE tab and one or more inactive second-level MFE tabs;
    in response to receiving user input to activate an inactive second-level MFE tab of the one or more inactive second-level MFE tabs, deactivating the active second-level MFE tab;
    generating, in the second MFE, a navigation event to a new URL specified by the activated second-level MFE tab;
    sending, by the second MFE, the navigation event to the first MFE;
    sending, by the first MFE, the navigation event to the shell application; and
    navigating, in the shell application, to the new URL.

2. The method of claim 1, further comprising:
    parsing, in the shell application, the new URL into an updated first route label and new unmatched portions;
    loading, in the shell application, the first MFE based on the updated first route label;
    sending, by the shell application, the new unmatched portions to the first MFE; and
    loading, by the first MFE, a third MFE nested in the first MFE, wherein the third MFE and the shell application are agnostic to one another.

3. The method of claim 1, further comprising:
    sending, by the first MFE, remaining unmatched portions to the second MFE; and
    loading, by the second MFE, a third MFE nested in the second MFE using a third route label corresponding to the third MFE determined from the remaining unmatched portions.

4. The method of claim 3, wherein the first MFE is agnostic to the third MFE, and the shell application is agnostic to the second and third MFEs.

5. The method of claim 3, wherein the shell application integrates the first, second, and third MFEs using MFE standard protocols.

6. The method of claim 3, further comprising dynamically updating the shell application and the first, second, and third MFEs throughout a life of the shell application using data obtained from a shell application repository and one or more MFE repositories.

7. The method of claim 1, further comprising loading the shell application in an internet browser based on the URL, wherein the shell application comprises routes for identifying and parsing out the first route label.

8. A system, comprising:
    one or more processors;

memory communicatively coupled to the one or more processors, the memory storing instructions which, when executed by the one or more processors, cause the one or more processors to:
provide a shell application configured to:
navigate to a uniform resource locator (URL) by:
parsing the URL into a first route label and unmatched portions, the first route label corresponding to a first micro front end (MFE);
loading the first MFE based on the first route label; and
sending the unmatched portions to the first MFE;
provide the first MFE configured to:
receive the unmatched portions from the shell application;
determine a second route label from the unmatched portions, the second route label corresponding to a second MFE;
load the second MFE based on the second route label, wherein loading the second MFE comprises loading an active second-level MFE tab and one or more inactive second-level MFE tabs; and
provide the second MFE configured to:
in response to receiving user input to activate an inactive second-level MFE tab of the one or more inactive second-level MFE tabs, deactivate the active second-level MFE tab;
generate a navigation event to a new URL specified by the activated second-level MFE tab; and
send the navigation event to the first MFE;
the first MFE is further configured to, in response to receiving the navigation event from the second MFE, send the navigation event to the shell application; and
the shell application is further configured to, in response to receiving the navigation event from the first MFE, navigate to the new URL based on the navigation event;
wherein the shell application, the first MFE, and the second MFE together are configured to provide a web application that can be run in a browser; and
wherein the shell application is agnostic to the second MFE and the second MFE is agnostic to the shell application.

9. The system of claim 8, wherein:
the shell application is further configured to:
parse the new URL into an updated first route label and new unmatched portions;
load the first MFE based on the updated first route label;
send the new unmatched portions to the first MFE; and
the first MFE is further configured to, in response to receiving the new unmatched portions from the shell application, load a third MFE nested in the first MFE, wherein the third MFE and the shell application are agnostic to one another.

10. The system of claim 8, wherein:
the first MFE is further configured to send remaining unmatched portions to the second MFE; and
the second MFE is further configured to, in response to receiving the remaining unmatched portions from the first MFE, load a third MFE nested in the second MFE using a third route label corresponding to the third MFE determined from the remaining unmatched portions.

11. The system of claim 10, wherein the first MFE is agnostic to the third MFE, and the shell application is agnostic to the second and third MFEs.

12. The system of claim 10, wherein the instructions further cause the one or more processors to:
dynamically update the shell application and the first, second, and third MFEs throughout a life of the shell application using data obtained from a shell application repository and one or more MFE repositories.

13. The system of claim 8, wherein the instructions further cause the one or more processors to:
load the shell application in an internet browser based on the URL, wherein the shell application comprises routes for identifying and parsing out the first route label.

14. A non-transitory computer-readable medium storing instructions that, when executed by at least one computing device, cause the at least one computing device to perform operations comprising:
parsing, in a shell application of a web application, a uniform resource locator (URL) for the web application into a first route label and unmatched portions;
loading, in the shell application, a first micro front end (MFE) nested in the shell application based on the first route label;
sending, by the shell application, the unmatched portions to the first MFE;
loading, by the first MFE, a second MFE nested in the first MFE using a second route label corresponding to the second MFE determined from the unmatched portions, wherein loading the second MFE comprises loading an active second-level MFE tab and one or more inactive second-level MFE tabs;
in response to receiving user input to activate an inactive second-level MFE tab of the one or more inactive second-level MFE tabs, deactivating the active second-level MFE tab;
generating, in the second MFE, a navigation event to a new URL specified by the activated second-level MFE tab;
sending, by the second MFE, the navigation event to the first MFE;
sending, by the first MFE, the navigation event to the shell application; and
navigating, in the shell application, to the new URL.

15. The non-transitory computer-readable medium of claim 14, the instructions further comprising:
parsing, in the shell application, the new URL into an updated first route label and new unmatched portions;
loading, in the shell application, the first MFE based on the updated first route label;
sending, by the shell application, the new unmatched portions to the first MFE; and
loading, by the first MFE, a third MFE nested in the first MFE, wherein the third MFE and the shell application are agnostic to one another.

16. The non-transitory computer-readable medium of claim 14, the instructions further comprising:
sending, by the first MFE, remaining unmatched portions to the second MFE; and
loading, by the second MFE, a third MFE nested in the second MFE using a third route label corresponding to the third MFE determined from the remaining unmatched portions.

17. The non-transitory computer-readable medium of claim 16, wherein the first MFE is agnostic to the third MFE, and the shell application is agnostic to the second and third MFEs.

18. The non-transitory computer-readable medium of claim 16, wherein the shell application integrates the first, second, and third MFEs using MFE standard protocols.

19. The non-transitory computer-readable medium of claim 16, the instructions further comprising dynamically updating the shell application and the first, second, and third MFEs throughout a life of the shell application using data obtained from a shell application repository and one or more MFE repositories.

20. The non-transitory computer-readable medium of claim 16, the instructions further comprising loading the shell application in an internet browser based on the URL, wherein the shell application comprises routes for identifying and parsing out the first route label.

* * * * *